March 9, 1954

W. M. HENDERSON 2,671,489

ANTISLIP GIRDLE FOR TIRES

Filed March 9, 1949

INVENTOR.
WALLACE MITCHELL HENDERSON
BY
Carlson Pitzner Hubbard + Wolfe
ATTORNEYS

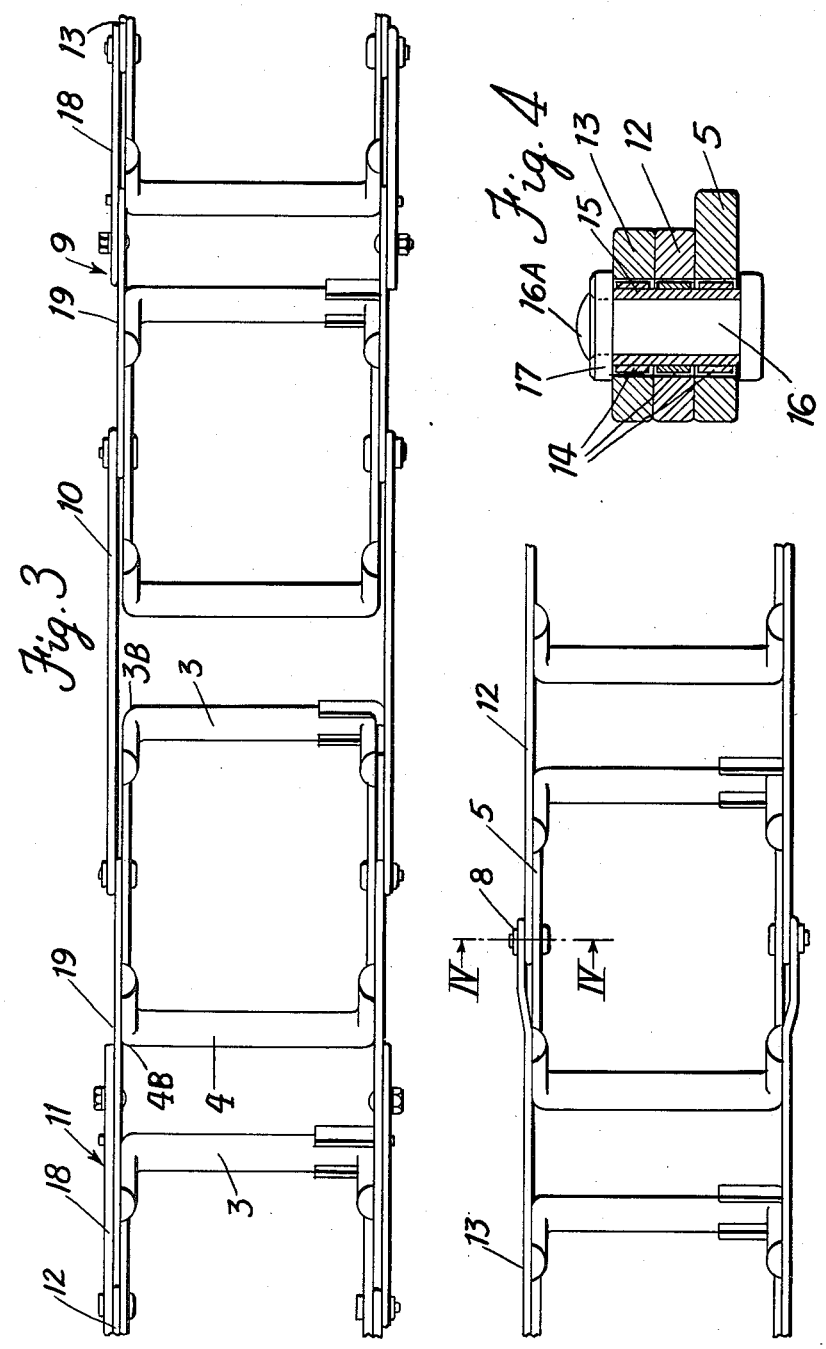

March 9, 1954 W. M. HENDERSON 2,671,489
ANTISLIP GIRDLE FOR TIRES
Filed March 9, 1949 5 Sheets-Sheet 3
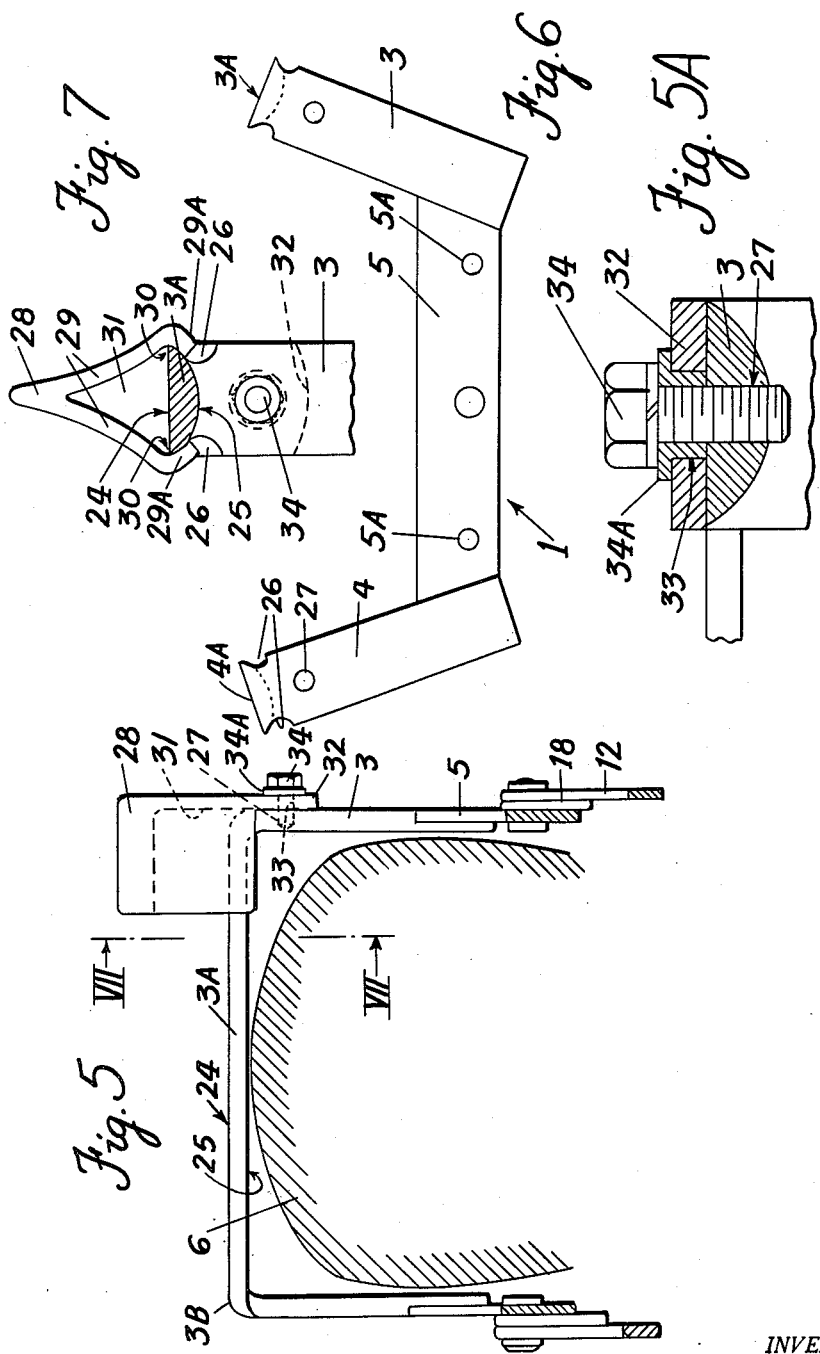
INVENTOR.
WALLACE MITCHELL HENDERSON
BY
ATTORNEYS March 9, 1954  W. M. HENDERSON  2,671,489
ANTISLIP GIRDLE FOR TIRES
Filed March 9, 1949  5 Sheets—Sheet 4
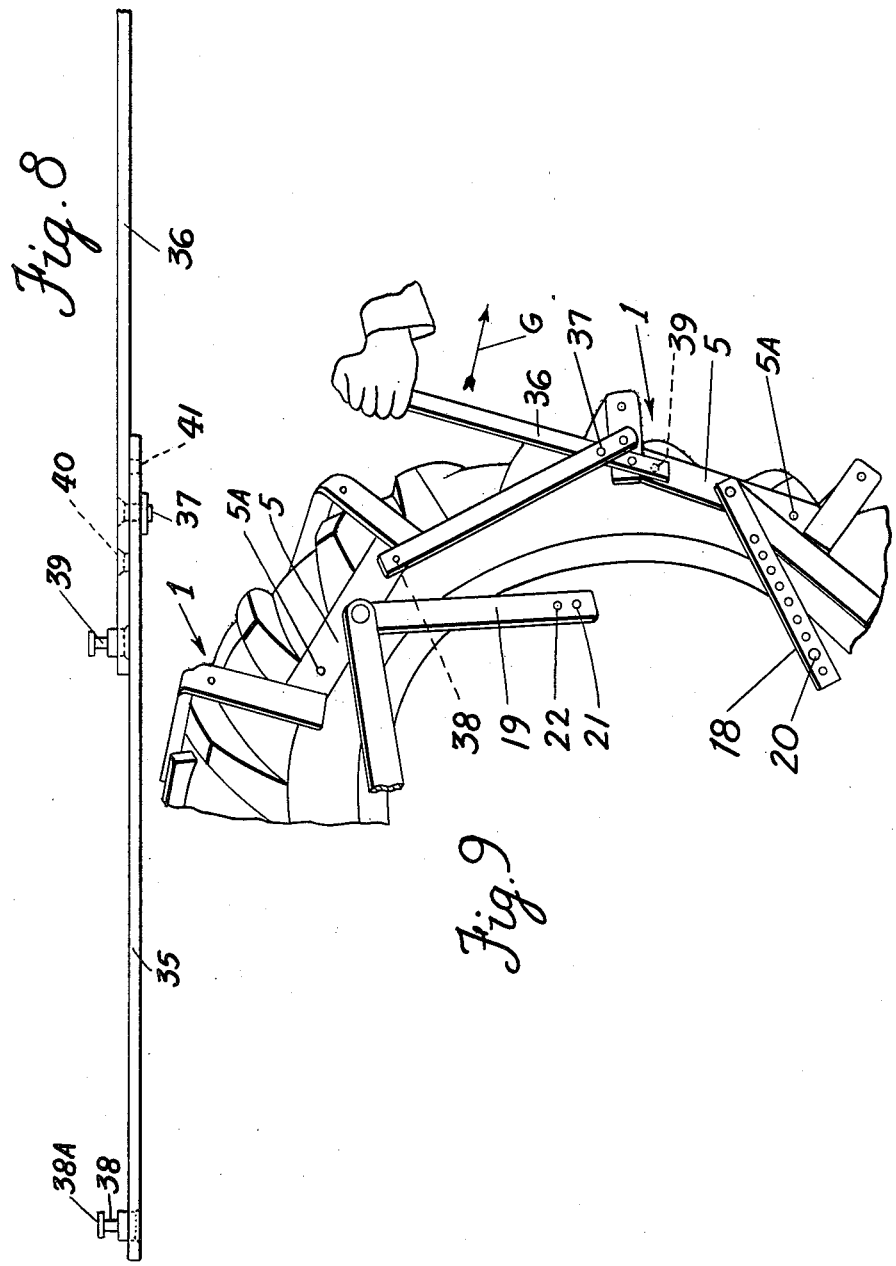
INVENTOR.
WALLACE MITCHELL HENDERSON
BY
ATTORNEYS

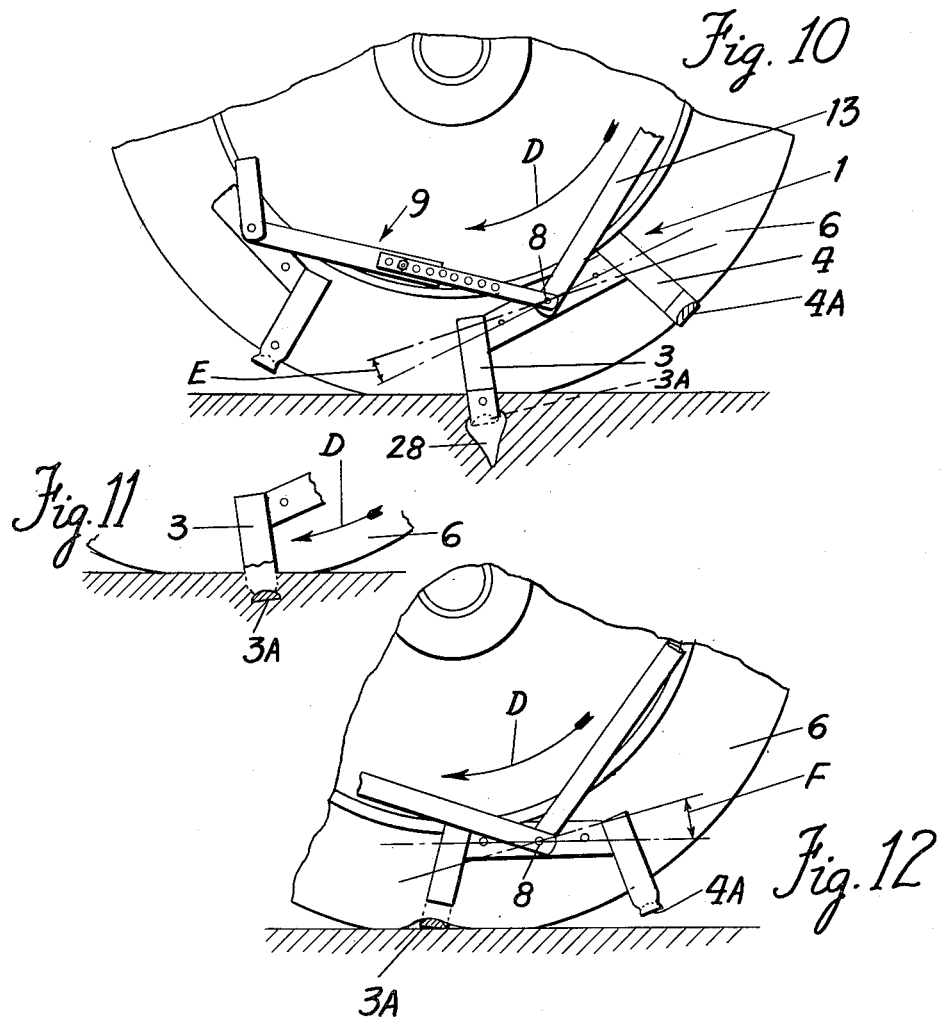

UNITED STATES PATENT OFFICE 2,671,489

ANTISLIP GIRDLE FOR TIRES

Wallace Mitchell Henderson, Cochno, Duntocher, Scotland

Application March 9, 1949, Serial No. 80,531

Claims priority, application Great Britain March 10, 1948

6 Claims. (Cl. 152—229)

This invention relates to improvements in antislip girdle attachments for the pneumatic tires of the wheels of agricultural tractors and like vehicles.

An object of the invention is to provide a girdle attachment which is cheaply and easily produced, and which in use is durable and highly effective, does not slip relatively to the tire, and does not become clogged with soil.

An embodiment of the invention will now be described, simply by way of example, with reference to the accompanying drawings in which:

Figs. 3 and 3A are plan views of the girdle detached from the wheel.

Fig. 4 is a sectional detail view on the line IV—IV of Fig. 3A, showing a pin joint of the linkwork.

Fig. 5 is a fragmentary transverse sectional view of the girdle on the tire.

Fig. 5A is a fragmentary sectional view on the line X—X of Fig. 1.

Fig. 6 is a side elevation of a unit removed from the girdle.

Fig. 7 is a sectional view on the line VII—VII of Fig. 5.

Fig. 8 is a plan view of a tool for use in tightening the girdle around the tire and connecting the ends of the linkwork.

Fig. 9 is a perspective view showing the tool of Fig. 8 in use.

Fig. 10 is a fragmentary side view showing the action of a spud-fitted girdle unit on slipping of the wheel.

Fig. 11 is a fragmentary side view similar to Fig. 10, showing the anti-skid action of a girdle unit in a girdle from which the spuds have been removed.

Fig. 12 is a fragmentary side view of the action of a girdle unit, without spuds, on a road surface.

Figure 1:
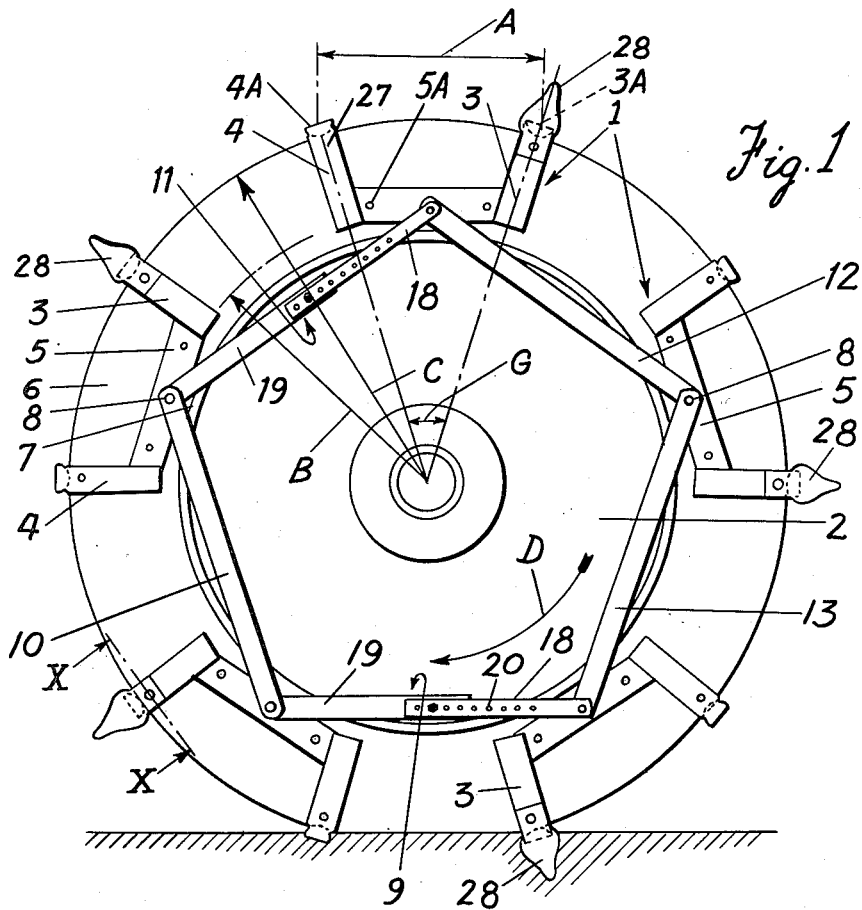
Fig. 1 is a side view of an anti-slip girdle attached to the pneumatic tire of a rear wheel of an agricultural tractor and showing a spud entering the ground.

Referring to the drawings:

The girdle consists of five units 1 interconnected at each side of the wheel 2 by a pentagonal linkwork 9 to 13. Each unit 1 consists of a spaced pair of radially disposed U-straps 3 and 4 rigidly interconnected by two opposed tangential bars 5 of which the ends are welded to the ends of the limbs of said U-straps, the radial depth of the U-straps being such that the bars 5 at each side of the tire are, as shown in Fig. 1, approximately tangential to a rim 7 of diameter about equal to the inner diameter of the tire 6. These units 1 are thus adapted to saddle the tire 6 and are interconnected at each side of the tire by the linkwork 9 to 13 of which the pin joints 8 connect with the mid-length points of the tangential bars 5; each pin joint 8 of the linkwork (Fig. 4) consists of three hardened steel bushes 14 axially grooved or knurled on their outer faces and forcefitted respectively into the members 13, 12 and 5, a hardened steel bearing sleeve 15 passing through the bushes, a connecting pin 16 in the sleeve, and a washer 17 secured in locking position by riveting over the end of the pin 16 as at 16A, the sleeve being of such length as to provide slight axial freedom of movement of the pin and the sleeve in an axial direction in the bushes.

To enable attachment and removal of the girdle, each of the links 9 and 11 of the linkwork is in two disconnectible parts 18 and 19. Part 18 has therein a series of round holes 20 one of which is engaged by a pin 21 on the part 19, and a square hole 22 in the part 19 is in alignment with one of the holes 20. A bolt 23 passes through the aligned holes and, in conjunction with the pin 21, secures the link parts against parting and "breaking." As shown in Fig. 3, the links 9 to 12 are straight, while the link 13 is cranked.

The bases 3A and 4A of the U-straps 3 and 4 thus function as a pair of substantially spaced tread members. The distance A (Fig. 1) between the tread members 3 and 4 is in the region of 14 inches, and the angle G between them is about 36 degrees. Also, the radius B of a circle through the pivotal connections 8 is about 15 inches, and the radius C of the tire tread is about 21 inches. On rotation of the wheel in the direction of arrow D, it will be clear that the members 3A constitute soil-engaging tread members on the leading side of connections 8, and the members 4A constitute trailing tread members on the remote side of connections 8.

The U-straps 3 and 4 have sharp angular corners 3B and 4B and are made from "cope iron" bent to U-form with the flat side 24 outermost and the convex side 25 innermost. The tangential bars 5 are bars of plain flat section. The sharp corners 3B and 4B constitute lugs which tend to prevent side-wise slipping of the tractor.

The U-straps 3 and 4, at each corner 3B and 4B and on each side thereof, have a cut out part or nick 26, and at a slight distance radially inward therefrom, a screw-threaded hole 27 extending parallel to the tire axis.

A series of spuds 28 are attached to the leading tread members 3A of the girdle so as to engage the soil and assist in preventing slipping of the wheel. The spuds 28 are each formed of a hollow body comprising two limbs 29 disposed in substantially V-shape in transverse section, the ends 29A of the limbs being bent inwardly at an angle of approximately 90° so as to form two opposed longitudinally extending re-entrant grooves 30 which slidably engage the longitudinal edges of the tread member 3A so as to connect the spud with the tread member and permit removal of the spud therefrom. One end of the spud 28 is open and the other end is closed by a web 31 which joins the limbs 29 and extends somewhat in a direction remote from the apex of the spud in a transverse plane to form a lug 32, and such lug has an attachment hole 33.

To attach the spud 28 it is slid transversely, that is, in a direction parallel to the wheel axis, on to the leading tread member 3A of the unit I with the said re-entrant grooves 30 engaging the opposite longitudinal edges of the tread 3A, the extremities 29A of the side limbs 29 of the spud being allowed to engage under the tread part 3A by virtue of the said nicks 26. When the spud has been pushed to the full extent of its travel, the said lug 32 abuts on the radially disposed U-strap limb 3 of the unit I and a flanged spacer sleeve 34A (Fig. 5) is passed through the hole 33 in the lug 32 and abuts against the limb 3 with the flange just clear of the face of the lug 32, as shown. A screw 34 is then passed through the sleeve 34A and into the screw hole 27 in the limb 3, one screw 34 thus securing the spud in position. The clearance referred to and shown leaves the spud slightly free so any slight rocking thereof which may be allowed by the grooves 30 will not tend to loosen the screw. The function of the screw is merely to hold the spud in position, the tangential forces being taken by the sliding connection above-described.

In a modification, the V-section spud 28 is instead provided at its closed end 31 with opposed spring clips which, when the spud is fully pushed on to the tread member 3A, automatically resiliently engage the radial part 3 of the unit I.

The formation of the straps 3 and 4 of the units I as aforesaid of "cope iron," ensures an angle of attack of the leading tread members on the soil which gives a good grip. Moreover, the convex section of the leading tread members presents a sharp edge to give a chisel-like effect, and in addition, the convex side being towards the tire, cutting or bruising of the tire by the girdle is prevented. The tread members may, of course, be of any convenient section, and if substantially flat may be disposed generally in a direction tangentially of the tire or at an angle inclined somewhat to the tangential.

In operation (see Fig. 10), the leading tread member 3A with its spud 28 engages the soil, and assuming that there is a tendency to slip, causes the unit I to pivot anticlockwise about its connection 8, from the radial position through an angle E, thereby causing the trailing tread member 4A to react on and depress the tire surface and so limit the pivotal movement of the unit. Moreover, the other units I are drawn hard against the tire by the resultant tension in the connecting links; that is to say, the unit I in working position may be regarded as a lever whereof one end fulcrums about the tire and whereof an intermediate point 8 causes an outward pull on the vertex of links 9 and 13, which pull tends to tighten the rest of the girdle closely about the tire and prevent slipping of the girdle relative to the tire. This limited pivotal movement causes the leading tread member 3A to engage the soil at an angle which increases the grip thereon. The spacing of the tread member 3A substantially ahead of the pivotal connection 8 enables a substantial grip-increasing movement of the tread member with small angular movement about the connection. The units I perform only comparatively small pivotal movements relative to the tire 6, thus increasing the life of the pivots 8 and therefore of the whole girdle attachment. The spuds 28 which are easily detachable when the girdle is to be used on roads or hard surfaces, enable an effective grip to be obtained on very slippy surfaces such as on freshly laid manure, mud or soft ground. Each spud 28 readily penetrates such ground, and the action of the soil on the spud causes pivoting movement of the unit and so draws the tread member from the tire to the depth at which the member gives a good gripping effect. For ordinary soft surfaces the spuds are removed and an effective anti-slip gripping action is obtained solely by the tread members 3A, as shown in Fig. 11. Thus, pivoting movement of the unit under the action of the soil on the tread member 3A causes the latter to move out from the tire to a greater radius and grip the soil. When the wheel is slipping and the trailing tread member 4A contacts the ground, gripping action does not take place, the effect of slipping being simply to press the member 4A closer into the tire. This causes a compressive upward push on the vertex of links 9 and 13 and lifts several of the remaining units outwards from the tire so that any soil wedged between the tread members of said units and the tire is released and the girdle is automatically maintained free of clogging soil.

When there is no tendency to slip, the tread members 3A and 4A remain approximately tangential to the tire and there is very little pivotal movement of the units I.

When the spuds 28 are removed from the girdle to enable the vehicle to travel over a road or hard surface, on progress of the vehicle the units pivot through an angle F (Fig. 12). As shown, the leading tread member 3A deforms the tire 6 and the trailing tread member 4A pivots clear of the tire. Thereafter, on further progression of the vehicle, the member 4A deforms the tire and the member 3A pivots clear of the tire, and so on. Thus the girdle provides for smooth passage of the vehicle over a road without damaging the road surface.

It will be evident that for reversal of vehicle movement the leading and trailing tread members interchange functions, the operation otherwise being similar. Thus, the spuds 28 would be attached to the mmebers 4A instead of to the members 3A. If it is considered unnecessary to provide for reverse movement, the trailing tread member 4A and associated parts of each unit may be of any convenient shape in order merely to provide the reaction on the tire to limit the pivoting of the unit.

Figure 2:
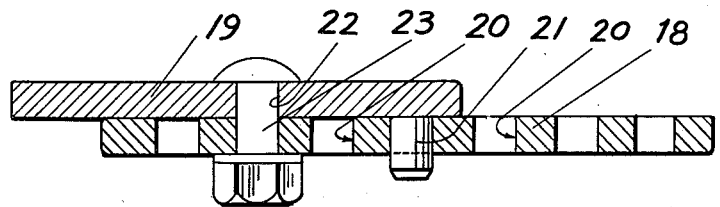
Fig. 2 is a part-sectional view of the disconnectible coupling means for the polygonal link work.

In winding the girdle around the wheel tire 6, the hand tool shown in Figs. 8 and 9 is used to draw together the free ends 18 and 19 which are then joined in the manner indicated in Fig. 2 to complete the linkwork. The hand tool consists of a link 35 to which is pivotally mounted a hand lever 36 by means of a screw 37. A pin 38 mounted at one end of the link 35 and having a head 38A is engaged in the hole 5A in the bar 5 of the adjacent unit 1, and a pin 39 similar to the pin 38 is mounted at the end of the lever 36 and is engaged in the hole 5A in the bar 5 of the adjacent unit 1. By pulling the lever 36 in the direction indicated by the arrow G, the two units 1 are drawn together and the girdle is tightened around the tire to a correct degree of tension, whereupon the joining of the parts 18 and 19 can be readily effected. The location of the holes 5A adjacent the ends of the units 1 not only avoids interference with the manipulation of the parts 18 and 19 but also facilitates drawing together the free ends of the girdle by enhancing the application by the hand tool 35, 36 of force peripherally of the tire and substantially reducing the chordal component thereof. A countersunk hole 40 in the lever 36 and a tapped hole 41 in the link 35 provide for adjustment of the pivotal connection between the lever and link.

I claim:
1. An anti-slip girdle attachment comprising, in combination, a plurality of units adapted to saddle circumferentially spaced segments of a pneumatic tire, a linkwork having a plurality of rigid links equal in number to the number of said units and adapted to be arranged about the side of the tire in substantially regular polygonal configuration, adjacent end portions of adjacent ones of said links having a pivotal connection therebetween, each of said units comprising a spaced pair of U-straps, a pair of laterally spaced bars rigidly fixed to the terminal ends of the limbs of said U-straps for interconnecting the latter, said bars being adapted to engage substantially mid-way of their length said pivotal connection to permit relative angular movement between said units and said links, said U-straps having convex inner face in cross section and having limbs of such length that said bars are substantially tangential to a circle of diameter substantially equal to the inner diameter of the tire.

2. An anti-slip girdle attachment comprising a number of units adapted to saddle in series circumferentially spaced segments of a pneumatic tire, a linkwork having an equal number of rigid links adapted to be arranged in a polygonal configuration about the side of the tire, individual ones of said links being pivotally connected at their respective end portions to adjacent ones of said units, at least one of said links having disconnecting means to permit attachment and removal of the girdle, each of said units comprising a pair of circumferentially spaced U-straps adapted to engage substantially radially over the tire, a pair of laterally spaced bars rigidly connected at their ends to the respective end portions of the legs of said U-straps, said legs being of such a length that the bars are substantially tangential to a circle of a diameter about equal to the inner diameter of the tire, and spud means for connection to the outer end portion of one of said U-straps, each of said U-straps being adapted to receive said spud means so that said girdle may be operated in either forward and reverse directions by connecting said spud means to the leading one of said U-straps and without detaching said girdle from the tire.

3. An anti-slip girdle attachment for a pneumatic tire comprising a series of units adapted to saddle circumferentially spaced portions of the tire, a linkwork having a plurality of rigid links with pivotal connections between adjacent ends thereof joining the same in polygonal configuration, and equal in number to the number of said units and arranged about the side of the tire, each of said units including a transverse soil-engaging member, a tire-engaging member, and including a side bar rigidly secured to said members and serving to space said members apart, said side bars having pivotal connections adjacent the centers thereof at the vertices of the polygon defined by said links and positioned substantially inwardly from the outer circumference of the tire with said soil-engaging members disposed substantially forward of said connections in the direction of rotation of said tire and with said tire-engaging members disposed substantially rearward of said connections so that movement of a particular unit about its pivot as said tire is rotated is limited to a small angular rocking movement, which movement is sufficient to move the soil-engaging member substantially outward from the tread to increase the grip on the soil and tend to tighten the girdle about the tire, and so that with the soil-engaging member in operative engagement with the soil the tread-engaging member is out of engagement with the soil and upon engagement of the tread-engaging member with the soil the pivot tends to be moved inwardly so as to loosen the girdle about the tire and to release any clogging soil thereon.

4. An anti-slip girdle attachment comprising in combination a plurality of units adapted to saddle circumferentially spaced segments of a penumatic tire, a pair of linkworks having a plurality of pivotally connected links equal in number to the number of said units and adapted to be arranged about opposite sides of the tire in polygonal configuration, each of said units having a pair of transverse tread members, means arranged to lie inwardly along opposite sides of the tire for rigidly interconnecting the transverse tread members in circumferentially spaced relation, and direct pivotal connections adapted to take a compressive push between said means and the vertices of said linkworks, said tread members being spaced respectively substantially forward and rearward of said pivotal connections so that a small angular rocking movement of a particular unit about its pivot as said tire is rotated is sufficient to move the forward member substantially outward from the tread to increase the grip on the soil and so that each transverse member is in engagement with the soil substantially independently of the other of said members, and said pivotal connection being spaced substantially inwardly from the circumference of the tire relative to the outward movement of said forward tread member.

5. An anti-slip girdle attachment comprising in combination a plurality of units adapted to saddle circumferentially spaced segments of a pneumatic tire, a plurality of rigid links equal in number to the number of said units adapted to lie along the side of the tire and having pivotal connections at the end portions of said links for interconnecting said units, each of said units having a pair of transverse tread members spaced from each other circumferentially of the tire, a pair of transversely spaced bars arranged to lie along opposite sides of the tire, inwardly directed limbs at the ends of the transverse tread members for rigidly interconnecting the latter with the adjacent ends of said bars, said pivotal connections between said units and said links being positioned inwardly from the circumference of the tire in the region of the inner diameter of the latter and one of said tread members being spaced substantially forward of each of said pivotal connections and the second of said tread members being spaced substantially rearward of said pivotal connections so that a small angular rocking movement of a particular unit about its pivot as said tire is rotated is sufficient to move the forward member substantially outward from the tread to increase the grip on the soil and so that said rearward member limits the pivotal movement of said unit.

6. For a girdle attachment having a plurality of tread members of U-shaped construction adapted to be spaced circumferentially on the tire and to extend transversely over the face of the tire and inwardly along the sides thereof, a spud comprising in combination two limbs disposed in substantially V-shape in transverse section, the ends of said limbs being bent inwardly at an angle of approximately 90° so as to form two opposed longitudinally extending re-entrant grooves adapted to engage slidably the edges of a tread member, a web portion integral with the said limbs and closing one V-shaped end, said web having a depending lug portion adapted to extend inwardly along and abut against the inwardly extending portion of the tread member, a screw for holding said lug against said inwardly extending portion of the tread member and means for preventing said screw from being loosened by rocking movement of the spud relative to the tread member.

WALLACE MITCHELL HENDERSON.

References Cited in the file of this patent

UNITED STATES PATENTS

| Number | Name | Date |
| --- | --- | --- |
| 1,370,293 | Dowell | Mar. 1, 1921 |
| 1,371,140 | Bellach | Mar. 8, 1921 |
| 1,375,584 | Gero | Apr. 19, 1921 |
| 1,417,020 | Bass | May 23, 1922 |
| 1,920,506 | Hipkins | Aug. 1, 1933 |
| 2,440,632 | Hack | Apr. 27, 1948 |
| 2,507,037 | Miller | May 9, 1950 |

FOREIGN PATENTS

| Number | Country | Date |
| --- | --- | --- |
| 488,562 | Germany | Dec. 18, 1927 |
| 536,037 | Great Britain | Apr. 30, 1941 |